United States Patent
Kwon

(10) Patent No.: US 11,048,368 B2
(45) Date of Patent: Jun. 29, 2021

(54) CAPACITIVE IN-CELL TOUCH PANEL STRUCTURES AND READOUT METHOD IN THE SAME

(71) Applicant: Industry-University Cooperation Foundation Hanyang University, Seoul (KR)

(72) Inventor: Oh-Kyong Kwon, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/327,636

(22) PCT Filed: Jul. 6, 2017

(86) PCT No.: PCT/KR2017/007235
§ 371 (c)(1),
(2) Date: Feb. 22, 2019

(87) PCT Pub. No.: WO2018/038389
PCT Pub. Date: Mar. 1, 2018

(65) Prior Publication Data
US 2019/0227652 A1    Jul. 25, 2019

(30) Foreign Application Priority Data
Aug. 26, 2016    (KR) .......... 10-2016-0108869

(51) Int. Cl.
*G06F 3/044* (2006.01)
*G06F 3/041* (2006.01)
*G06K 9/00* (2006.01)

(52) U.S. Cl.
CPC ............ *G06F 3/0446* (2019.05); *G06F 3/041* (2013.01); *G06F 3/0412* (2013.01); *G06F 3/04166* (2019.05); *G06K 9/00* (2013.01)

(58) Field of Classification Search
CPC ........ G06F 3/044; G06F 3/041; G06F 3/0412; G06F 3/0416; G06K 9/00; G06K 9/0002
See application file for complete search history.

(56) References Cited

U.S. PATENT DOCUMENTS 8,618,865 B1 * 12/2013 Lu .......................... G06F 3/044
                                                            327/517
9,547,788 B1 *  1/2017 Ogirko ................ G06K 9/0002
(Continued)

FOREIGN PATENT DOCUMENTS

JP    2002-216117 A    8/2002
JP    2002-245443 A    8/2002
(Continued)

OTHER PUBLICATIONS

Office Action issued from Korean Patent Application No. 10-2016-0108869 dated Mar. 14, 2017.
(Continued)

*Primary Examiner* — Grant Sitta
(74) *Attorney, Agent, or Firm* — Sughrue Mion, PLLC

(57) ABSTRACT

A touch panel where touch/fingerprint recognition electrodes, including sub-pixels, pixels or pixel arrays in a row, share one sensing line is disclosed. The self capacitive touch panel comprises (m×n) sub-pixels, m and n being positive integer, respectively, and a driver configured to drive the sub-pixels. Here, touch/fingerprint recognition electrodes of sub-pixels in a row share one sensing line. Touch point detection and fingerprint recognition may be selectively driven through the touch panel and a readout method.

13 Claims, 20 Drawing Sheets

(56) References Cited

U.S. PATENT DOCUMENTS

| | | | |
|---|---|---|---|
| 9,684,400 B2 | 6/2017 | Liu | |
| 9,733,740 B2* | 8/2017 | Cho | G06F 3/0487 |
| 9,734,787 B2* | 8/2017 | Chang | G06K 9/00013 |
| 10,282,626 B2* | 5/2019 | Gao | G06K 9/00006 |
| 2009/0206849 A1* | 8/2009 | Chuang | G06K 9/0002 |
| | | | 324/686 |
| 2010/0039406 A1* | 2/2010 | Lee | G02F 1/13338 |
| | | | 345/174 |
| 2011/0069020 A1 | 3/2011 | Kim et al. | |
| 2013/0287272 A1* | 10/2013 | Lu | G06F 3/041 |
| | | | 382/124 |
| 2015/0029421 A1* | 1/2015 | Gu | G06F 3/044 |
| | | | 349/12 |
| 2015/0109214 A1* | 4/2015 | Shi | G06F 3/044 |
| | | | 345/173 |
| 2016/0077655 A1* | 3/2016 | Oda | G06F 3/0416 |
| | | | 345/174 |
| 2016/0098140 A1* | 4/2016 | Lee | G06F 3/0416 |
| | | | 345/173 |
| 2016/0132176 A1 | 5/2016 | Bae et al. | |
| 2016/0148036 A1* | 5/2016 | Kim | G06K 9/0002 |
| | | | 382/124 |
| 2016/0148037 A1 | 5/2016 | Baek et al. | |
| 2016/0188023 A1* | 6/2016 | Chang | G06K 9/00013 |
| | | | 345/173 |
| 2016/0196463 A1* | 7/2016 | Jiang | G06F 3/044 |
| | | | 348/77 |
| 2016/0227142 A1* | 8/2016 | Lin | G06K 9/00013 |
| 2016/0253538 A1* | 9/2016 | Lu | G06K 9/0002 |
| | | | 382/124 |
| 2016/0253541 A1* | 9/2016 | Yang | G09G 3/32 |
| | | | 382/124 |
| 2016/0328592 A1* | 11/2016 | Li | G06K 9/0002 |
| 2017/0003770 A1* | 1/2017 | Akhavan Fomani | G06F 3/044 |
| 2017/0006245 A1* | 1/2017 | Akhavan Fomani | G06K 9/0002 |
| 2017/0017828 A1* | 1/2017 | Bernstein | G06K 9/00053 |
| 2017/0032165 A1* | 2/2017 | Hansen | G06K 9/00067 |
| 2017/0061190 A1* | 3/2017 | Chen | G06K 9/0002 |
| 2017/0115811 A1* | 4/2017 | Yang | G06F 3/044 |
| 2017/0123555 A1* | 5/2017 | Kim | G06K 9/00013 |
| 2017/0147850 A1* | 5/2017 | Liu | G06F 3/0412 |
| 2017/0177111 A1* | 6/2017 | Qin | G06F 3/044 |
| 2017/0193261 A1* | 7/2017 | Schwartz | G06K 9/001 |
| 2017/0193266 A1* | 7/2017 | Ye | G06K 9/0002 |
| 2017/0220194 A1* | 8/2017 | Wu | G02F 1/13338 |
| 2017/0228572 A1* | 8/2017 | Lee | G06K 9/00087 |
| 2017/0285869 A1* | 10/2017 | Roziere | G06F 3/0443 |
| 2017/0308200 A1* | 10/2017 | Mugiraneza | G02F 1/134336 |
| 2017/0371213 A1* | 12/2017 | Wang | G06F 3/044 |
| 2018/0011599 A1* | 1/2018 | Cheng | G06F 3/04186 |
| 2018/0046281 A1* | 2/2018 | Pi | G06K 9/0004 |
| 2018/0052558 A1* | 2/2018 | Wang | H03K 17/955 |
| 2018/0181297 A1* | 6/2018 | Jurzak | G06F 3/04883 |
| 2018/0218191 A1* | 8/2018 | Berget | G06K 9/0002 |
| 2018/0224955 A1* | 8/2018 | Chen | G06F 3/0446 |

FOREIGN PATENT DOCUMENTS

| | | |
|---|---|---|
| JP | 2013-246825 A | 12/2013 |
| KR | 10-2011-0032874 A | 3/2011 |
| KR | 10-2016-0033328 A | 3/2016 |
| KR | 10-2016-0056760 A | 5/2016 |
| KR | 10-2016-0061163 A | 5/2016 |
| KR | 10-2016-0093750 A | 8/2016 |

OTHER PUBLICATIONS

Notice of Allowance issued from Korean Patent Application No. 10-2016-0108869 dated Aug. 9, 2017.

International Search Report of PCT/KR2017/007235 dated Oct. 26, 2017 [PCT/ISA/210].

* cited by examiner

CAPACITIVE IN-CELL TOUCH PANEL STRUCTURES AND READOUT METHOD IN THE SAME

PRIORITY

This application claims priority under 35 U.S.C. § 119(a) to a Korean patent application filed on Aug. 26, 2016 in the Korean Intellectual Property Office and assigned Serial No. 10-2016-0108869 and a PCT application PCT/KR2017/007235 filed on Jul. 6, 2017, the entire disclosure of which is incorporated herein by reference.

BACKGROUND

1. Field of the Invention

The present disclosure relates to a touch panel where touch/fingerprint recognition electrodes disposed in a row share one sensing line. Touch point detection and fingerprint recognition may be selectively driven through the touch panel and a readout method of the present disclosure.

2. Description of the Related Art

A touch panel, e.g. a touch panel used in a liquid crystal display device is used for detecting touch point.

FIG. 1 is a view illustrating a conventional touch panel.

As shown in FIG. 1, in the conventional touch panel, sensing lines are connected to touch electrodes, respectively. Accordingly, structure of the touch panel becomes complicated and manufacturing cost of the touch panel is high.

SUMMARY

The invention provides a touch panel where touch/fingerprint recognition electrodes disposed in a row share one sensing line. Additionally, the invention provides a touch panel capable of driving selectively touch point detection and fingerprint recognition and a readout method in the same.

According to one embodiment of the invention, a self capacitive touch panel comprising: (m×n) sub-pixels, m and n being positive integer, respectively; and a driver configured to drive the sub-pixels. Here, touch/fingerprint recognition electrodes of sub-pixels in a row share one sensing line.

According to another embodiment of the invention, a self capacitive touch panel comprising: pixels configured to have sub-pixels, respectively; and a driver configured to drive the pixels. Here, touch/fingerprint recognition electrodes including the pixels in a row share one sensing line.

According to still another embodiment of the invention, a self capacitive touch panel comprising: pixel arrays configured to have pixels, respectively; and a driver configured to drive the pixels. Here, each of the pixels has at least one sub-pixel, and touch/fingerprint recognition electrodes including pixel arrays in a row share one sensing line.

According to still another embodiment of the invention, a touch panel comprising: (m×n) sub-pixels, m and n being positive integer, respectively; and a driver configured to drive the sub-pixels. Here, at least one of the sub-pixels has a display transistor, a liquid crystal, a storage capacitor and a switching transistor, one of the switching transistor is connected to a node between the liquid crystal and the storage capacitor, other terminal of the switching transistor is connected to a scan line, and the display transistor is connected to a gate driver and a data driver.

According to still another embodiment of the invention, a touch panel comprising: touch sensors; and a driver configured to drive the touch sensors. Here, at least one of the touch sensors has sub-pixels, and touch electrodes including sub-pixels in a row share one sensing line.

In a touch panel of the invention, touch/fingerprint recognition electrodes disposed in a row share one sensing line, and thus a structure of the touch panel becomes simple and manufacturing cost of the touch panel may reduce. Moreover, the touch panel and a readout method in the same according to the invention may drive selectively touch point detection and fingerprint recognition.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to a touch panel, touch/fingerprint recognition electrodes including sub-pixels, pixels or pixel arrays disposed in a row may share one sensing line. Here, the touch panel may be a panel for performing both of touch point detection and fingerprint recognition or a panel for performing only the touch point detection.

Specially, a technique of sharing the sensing line according to the invention is more proper to a self capacitive touch panel.

A touch/fingerprint recognition electrode may be formed with small number of sub-pixels, e.g. 3×3 sub pixels in a touch panel for performing both of touch point detection and fingerprint recognition, but a touch electrode may be formed with many number of sub-pixels, e.g. 100×100 sub-pixels in a touch panel for performing only touch point detection without fingerprint recognition.

Hereinafter, embodiments of the invention will be described in detail with reference to accompanying drawings.

Figure 1:
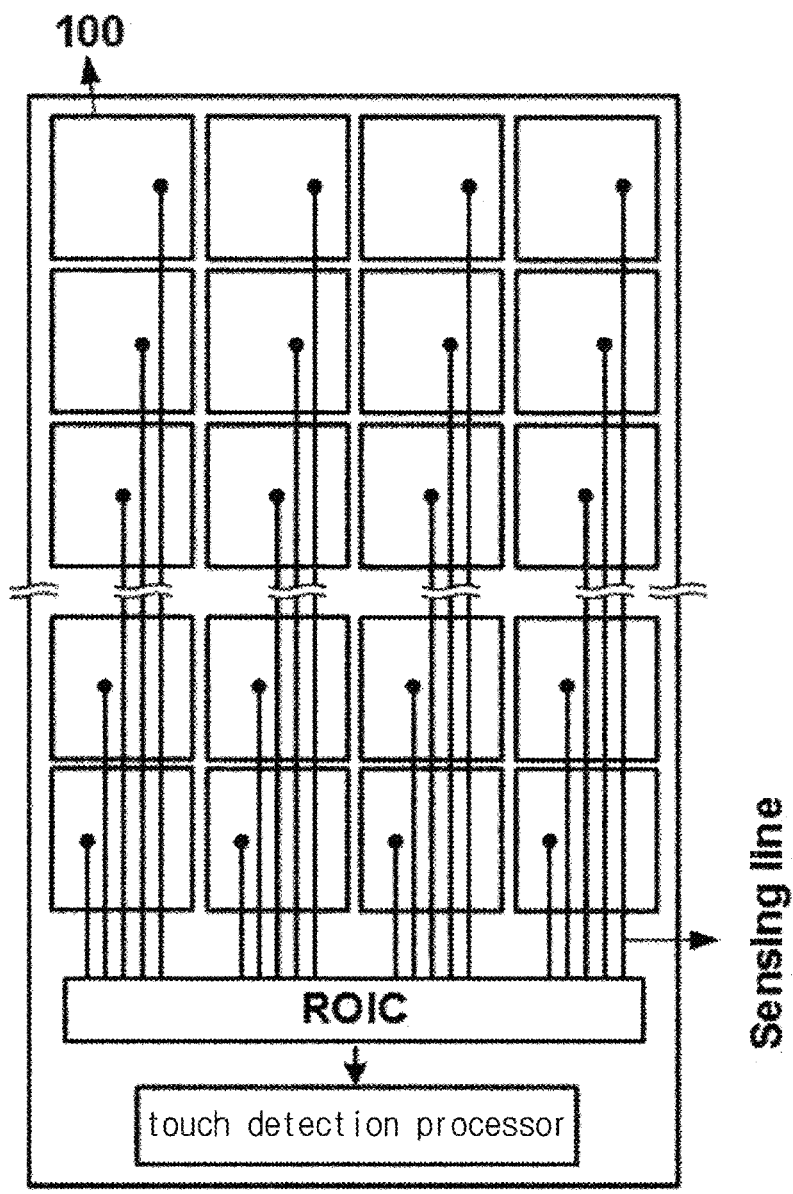
FIG. 1 is a view illustrating a conventional touch panel.
Figure 2:
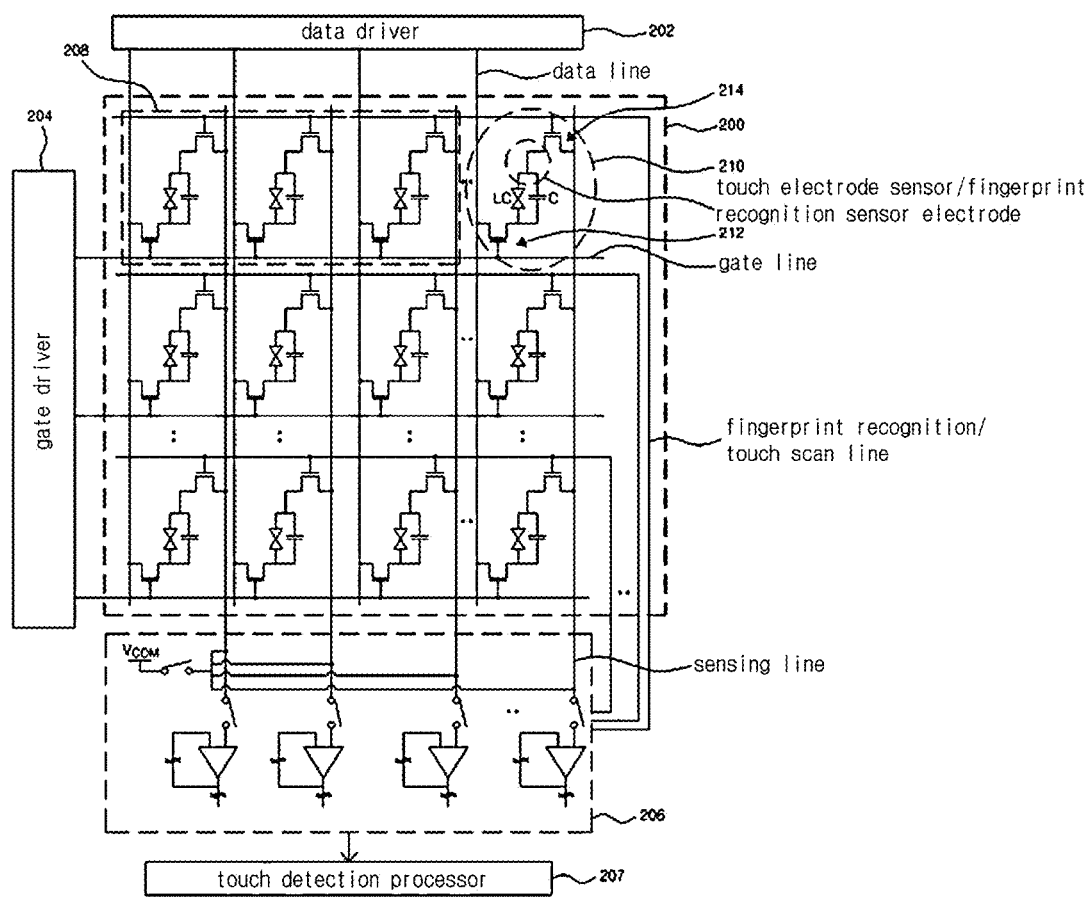
FIG. 2 is a view illustrating circuit of a touch panel according to one embodiment of the invention.
Figure 3:
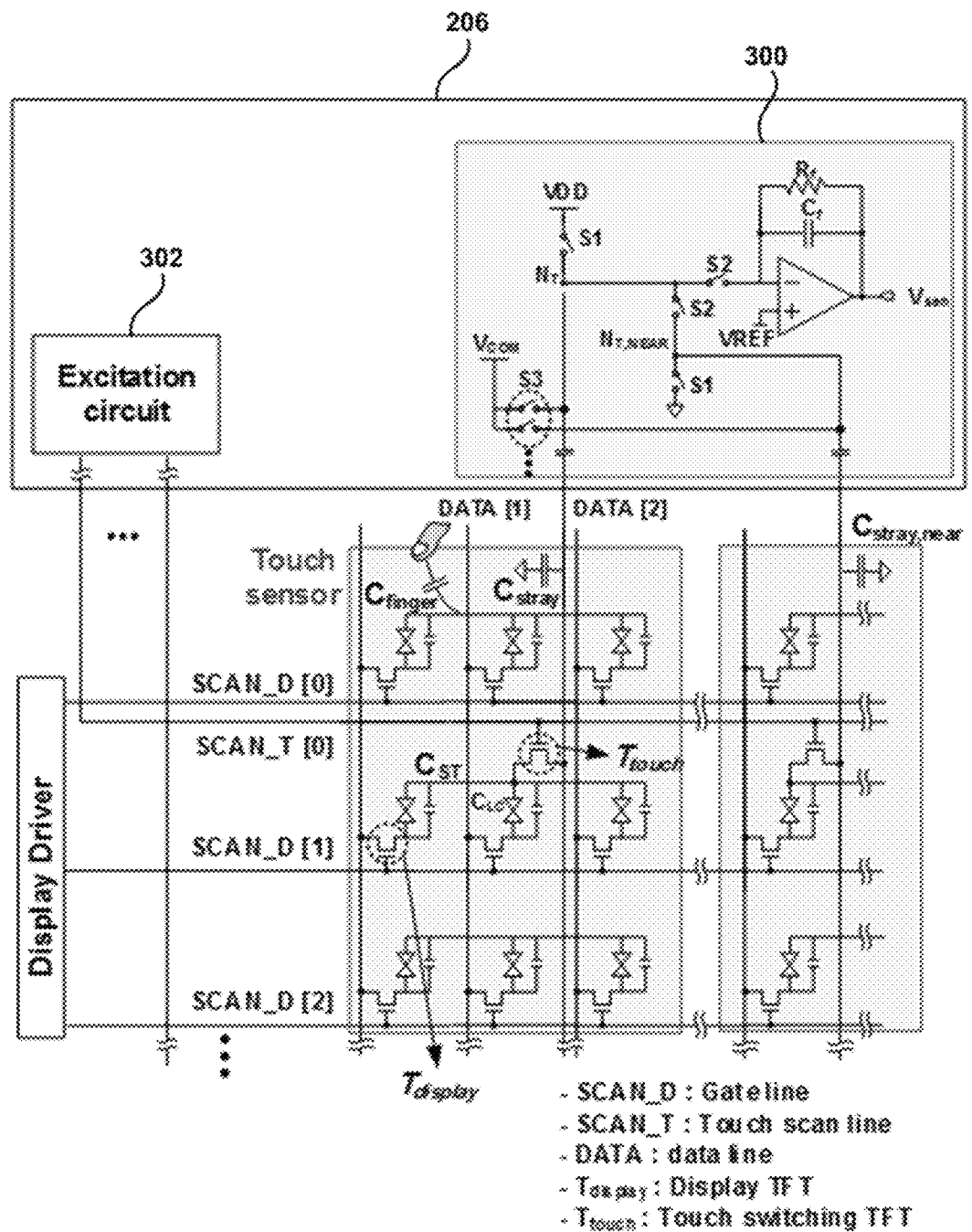
FIG. 3 is a view illustrating circuit for touch detection method in the touch panel according to one embodiment of the invention.
Figure 4:
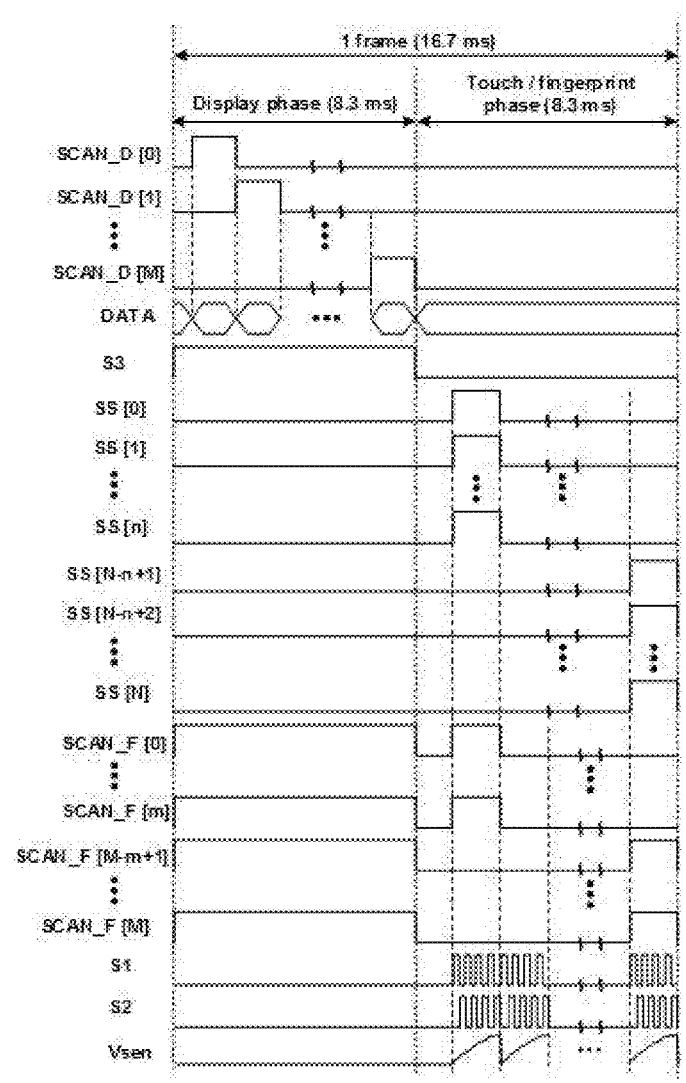
FIG. 4 is a timing diagram illustrating signals used in the touch detection method of FIG. 3.
Figure 5:
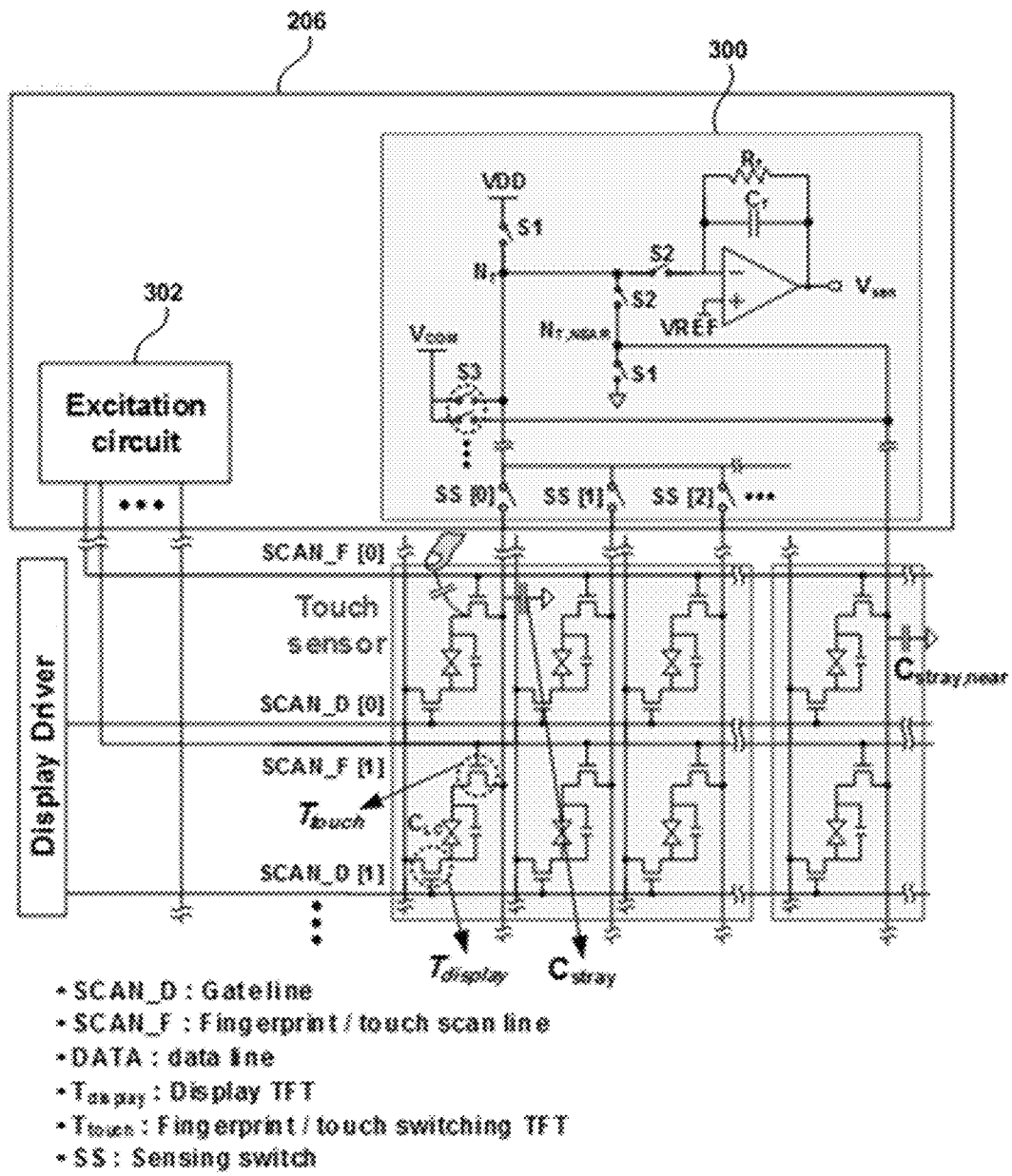
FIG. 5 is a view illustrating circuit for a fingerprint recognition method in a touch panel according to another embodiment of the invention.
Figure 6:
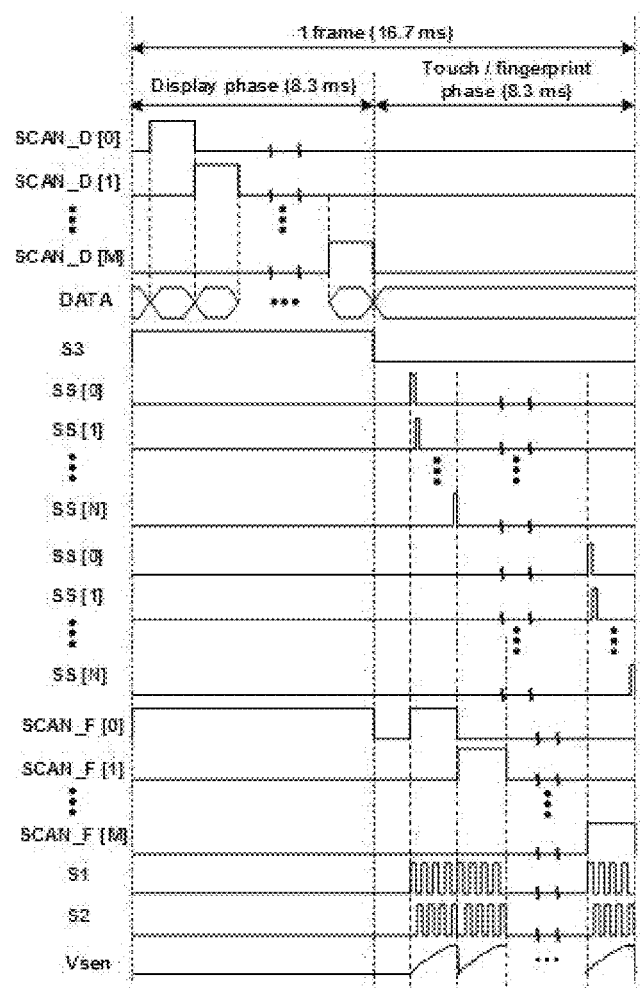
FIG. 6 is a timing diagram illustrating signals used in the fingerprint recognition method of FIG. 5.
Figure 7:
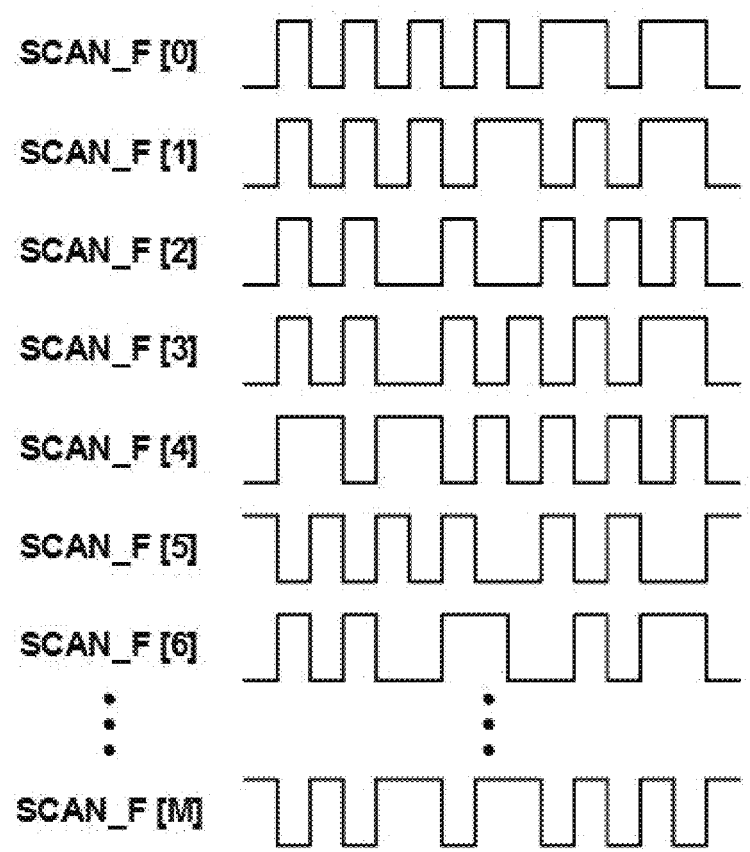
FIG. 7 is a timing diagram illustrating signals used in the fingerprint recognition method in the touch panel according to another embodiment of the invention.
Figure 8:
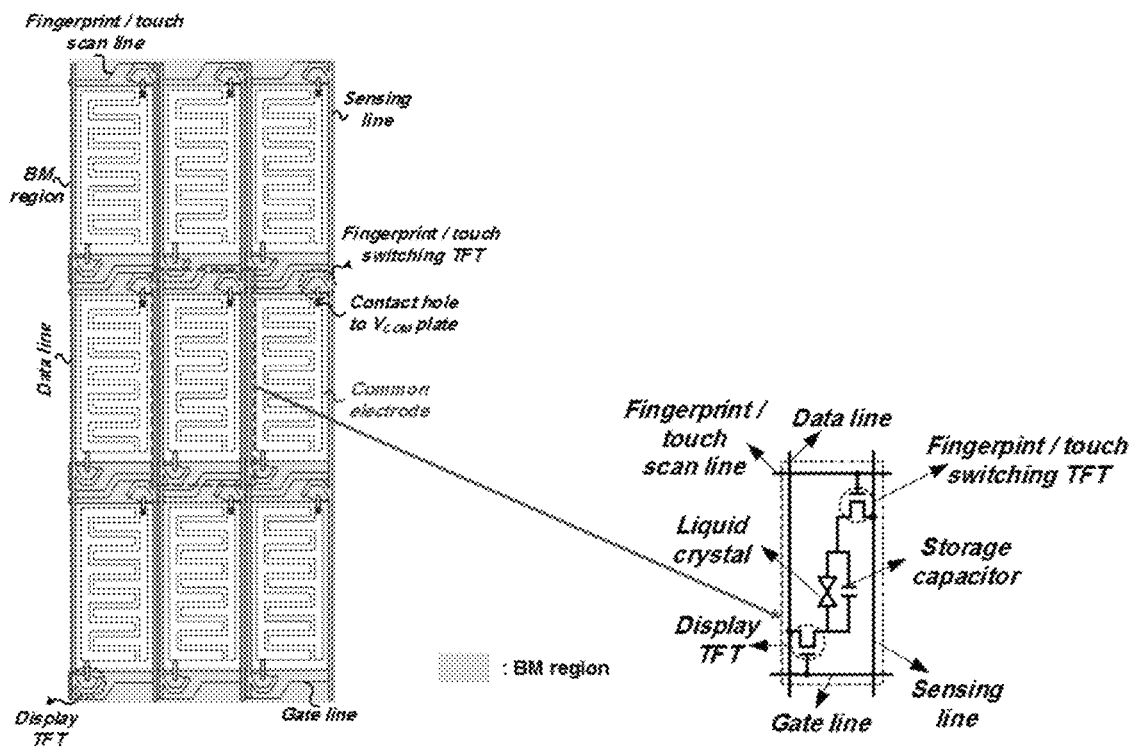
FIG. 8 is a view illustrating layout of the touch panel of FIG. 2 using an IPS mode according to one embodiment of the invention.
Figure 9:
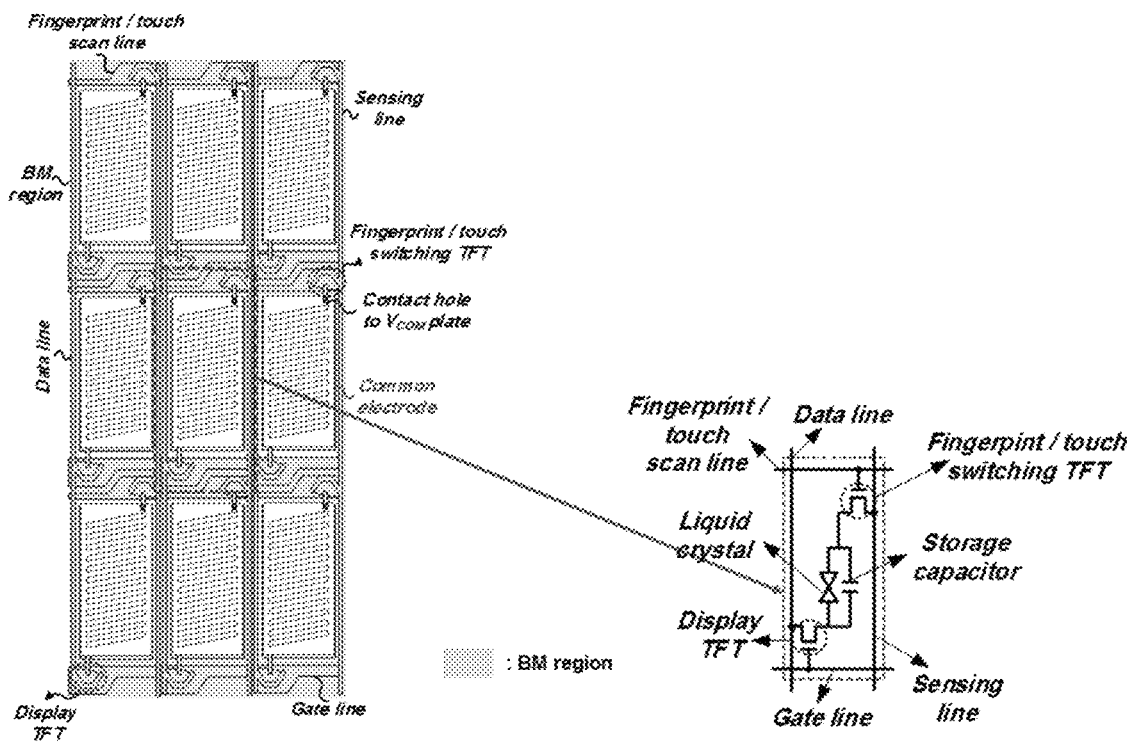
FIG. 9 is a view illustrating layout of the touch panel of FIG. 2 using an FFS mode according to one embodiment of the invention.
Figure 10:
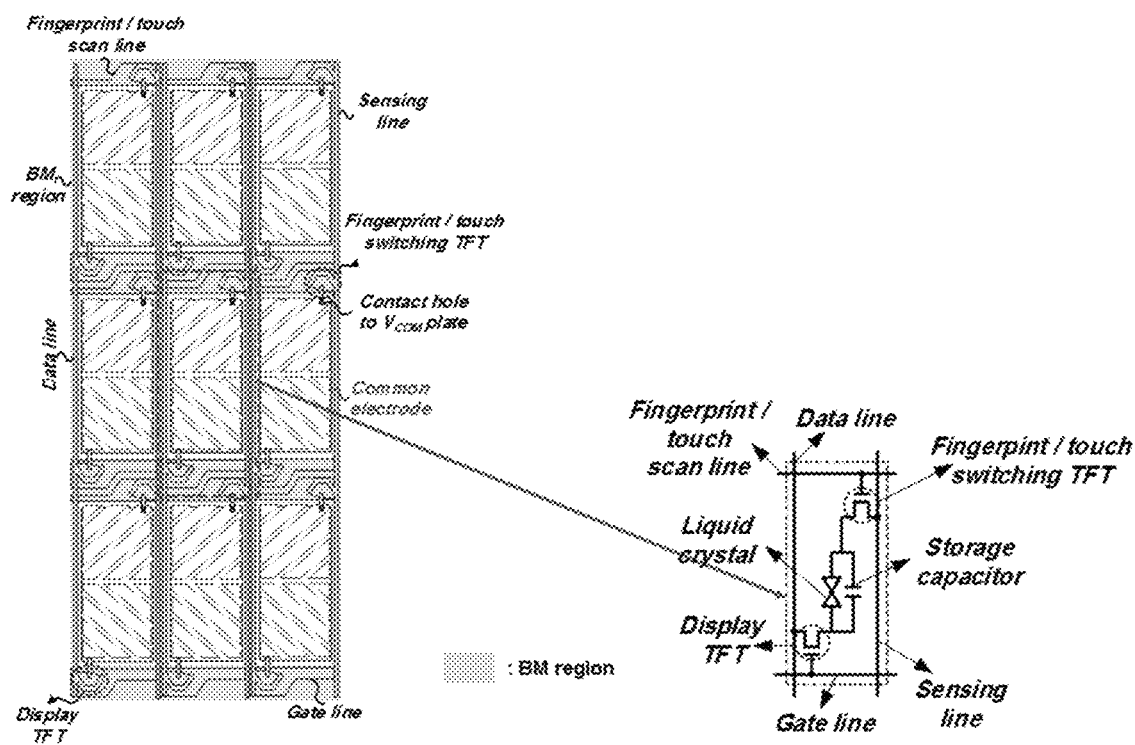
FIG. 10 is a view illustrating layout of the touch panel of FIG. 2 using a VA mode according to one embodiment of the invention.

FIG. 2 is a view illustrating circuit of a touch panel according to one embodiment of the invention, FIG. 3 is a view illustrating circuit for touch detection method in the touch panel according to one embodiment of the invention, and FIG. 4 is a timing diagram illustrating signals used in the touch detection method of FIG. 3. FIG. 5 is a view illustrating circuit for a fingerprint recognition method in a touch panel according to another embodiment of the invention, FIG. 6 is a timing diagram illustrating signals used in the fingerprint recognition method of FIG. 5, and FIG. 7 is a timing diagram illustrating signals used in the fingerprint recognition method in the touch panel according to another embodiment of the invention. FIG. 8 is a view illustrating layout of the touch panel of FIG. 2 using an IPS mode according to one embodiment of the invention, FIG. 9 is a view illustrating layout of the touch panel of FIG. 2 using an FFS mode according to one embodiment of the invention, and FIG. 10 is a view illustrating layout of the touch panel of FIG. 2 using a VA mode according to one embodiment of the invention.

In FIG. 2, the touch panel of the present embodiment may be for example liquid crystal display device, and perform both of touch point detection and fingerprint recognition.

In one embodiment, the touch panel may be a self capacitive touch panel.

The touch panel may include a touch electrode 200, a data driver 202, a gate driver 204, a readout circuit ROIC 206 and a touch detection processor 207. On the other hand, the data driver 202 and the gate driver 204 may be included in a display driver.

The touch electrode 200 includes at least one pixel 208, and the pixel 208 may include three sub-pixels 210 for recognizing fingerprint as shown in a dotted line box in FIG. 2. On the other hand, the pixel 208 may include four sub-pixels not three sub-pixels.

In view of fingerprint recognition, a fingerprint recognition electrode including one sub-pixel 210 may be referred to as a fingerprint recognition sensor in that it can recognize the fingerprint. A fingerprint recognition electrode including sub-pixels 210, i.e. one pixel 208 may be referred to as the fingerprint recognition sensor, or a fingerprint recognition electrode including a pixel array having pixels 208 may be referred to as the fingerprint recognition sensor.

Hereinafter, it is assumed that the fingerprint recognition electrode including one sub-pixel 210 is the fingerprint recognition sensor for convenience of description.

In this case, the touch sensor includes m (positive integer)×n (positive integer) fingerprint recognition sensors. Here, m means a number of sub-pixels in a row direction, and n indicates a number of sub-pixels in a horizontal direction. On the other hand, it is assumed that total number of the sub-pixels equals to M×N.

The sub-pixel 210 includes a liquid crystal LC, a storage capacitor C, a display thin film transistor TFT 212 and a switching TFT 214 as shown in a circular dotted line of FIG. 2.

The LC, the C and the display TFT 212 are the same as in conventional liquid crystal display panel, and thus any further description concerning the elements will be omitted. A gate of the display TFT 212 is connected to a gate line, and a drain/a source of the display TFT 212 is connected to a data line.

In one embodiment, the sub-pixel 210 further includes the switching TFT 214 compared with conventional sub-pixel.

A gate of the switching TFT 214 is connected to corresponding scan line, a drain/a source is connected to a node between the LC and the C, a source/a drain is connected to a sensing line. Here, the scan line does not exist in the conventional touch panel, and crosses over the sensing line, preferably is vertically disposed to the sensing line. As a result, the readout circuit 206 may transmit signals for driving the touch/fingerprint recognition electrodes to the touch/fingerprint recognition electrodes through the scan lines, and sense self capacitance or mutual capacitance of the touch/fingerprint recognition electrodes through the sensing line.

In view of the touch panel, the touch panel of the present embodiment further includes the switching TFTs 214 and the scan lines which are connected to the switching TFTs 214 and provide signals to the switching TFTs 214.

Touch/fingerprint recognition electrodes disposed in a row may share one sensing line as shown in FIG. 2. In the conventional touch panel, specially self capacitive touch panel, the touch electrodes are connected to different sensing lines, respectively. The touch panel may selectively drive the touch point detection and the fingerprint recognition.

In one embodiment, the sensing lines are connected to charge amplifiers (circuit of lowest position in the readout circuit) via sensing switches. The sensing switches don't exist in the conventional technique.

The readout circuit 206 transmits signals to the sub-pixels 210 through the scan lines, and senses self capacitance or mutual capacitance of corresponding touch sensor (particularly, touch/fingerprint recognition electrode) through the sensing lines. Here, the signal may be a square wave, a sine wave, a saw tooth wave, a rectangular wave, etc.

The touch detection processor 207 is connected to the readout circuit 206, and detects touch point or obtains fingerprint information through capacitance sensed by the readout circuit 206.

Briefly, in the touch panel of the present embodiment, the touch/fingerprint recognition electrodes of the sub-pixels disposed in a row share one sensing line. The touch panel may include further the switching TFT 214, the scan line and the sensing switch, for the purpose of sharing of the sensing line.

This structure may be applied to a touch panel in an In-Plane Switching IPS mode, a touch panel in a Fringe-Field Switching FFS mode and a touch panel in a Vertical Alignment VA mode, respectively. Layouts of the touch panels according to the modes are shown in FIG. 8 to FIG. 10.

In one embodiment, the scan line, the sensing line and the switching TFT 214 may be disposed in a black matrix BM area.

The touch/fingerprint recognition electrodes may use a vertical field driven method such as a twisted nematic TN mode and the VA mode, or a horizontal field driven method such as the IPS mode and the FFS mode.

Hereinafter, a process of performing selectively the touch point detection and the fingerprint recognition by using circuits in FIG. 2 to FIG. 6 will be described.

Firstly, a process of performing the touch point detection in the touch panel in FIG. 2 will be described in detail with reference to drawings FIG. 3 and FIG. 4. In FIG. 3 and FIG. 4, SCAN_D means a signal of a gate line, SCAN_F indicates a signal of a scan line, and DATA means a signal of a data line. Tdisplay indicates a display TFT, Ttouch means a switching TFT, and SS indicates a sensing switch.

In a display phase, the readout circuit 206 provides a VCOM voltage to a common electrode through the sensing lines.

Subsequently, in a touch/fingerprint phase, the readout circuit 206 transmits signals to the sub-pixels 210 through every scan line.

Next, the readout circuit 206 turns on simultaneously the sensing switches between the scan lines and charge amplifiers.

Subsequently, the readout circuit 206 senses self capacitance or mutual capacitance of the touch electrodes through the sensing lines, and the touch detection processor 207 detects touch point through the sensed capacitance.

Hereinafter, a process of performing the fingerprint recognition in the touch panel in FIG. 2 will be described in detail with reference to drawings FIG. 5 and FIG. 6. In FIG. 5 and FIG. 6, SCAN_D means a signal of the gate line, SCAN_F indicates a signal of the scan line, and DATA means a signal of the data line. Tdisplay indicates the display TFT, Ttouch means the switching TFT, and SS indicates the sensing switch.

In a display phase, the readout circuit 206 provides a VCOM voltage to the common electrode through the sensing lines.

Subsequently, in a touch/fingerprint phase, an excitation circuit 302 of the readout circuit 206 transmits a signal to one of the scan lines as shown in FIG. 6, but does not provide a signal to the other scan lines.

In this time, the sensing switches SS between the sensing lines and the charge amplifiers are sequentially connected during a high logic interval of the signal transmitted to the scan line. That is, the sensing lines are sequentially activated.

A sensing circuit 300 of the readout circuit 206 senses self capacitance or mutual capacitance of fingerprint recognition electrodes connected to the sensing lines.

The above process may be repeatedly performed for each of the scan lines to which signals are transmitted in sequence. Detailed operation for the scan lines is shown in FIG. 6.

As a result, corresponding fingerprint recognition sensors operate sequentially for each of the scan lines. Here, the sensing circuit 300 of the readout circuit 206 may sense self capacitance or mutual capacitance of the fingerprint recognition electrodes, and the touch detection processor 207 may obtain fingerprint information through the sensed self capacitance or mutual capacitance.

Hereinafter, a fingerprint recognition process according to another embodiment of the invention will be described in detail.

Orthogonal signals are simultaneously transmitted to every scan line as shown in FIG. 7.

Subsequently, the sensing switches SS between the sensing lines and the charge amplifiers are simultaneously connected.

As a result, the readout circuit 206 may sense self capacitance or mutual capacitance of the fingerprint recognition electrodes at a sub-pixel connected to the scan lines to which the signals are transmitted, and the touch detection processor 207 may obtain fingerprint information through the sensed self capacitance or mutual capacitance.

Figure 11:
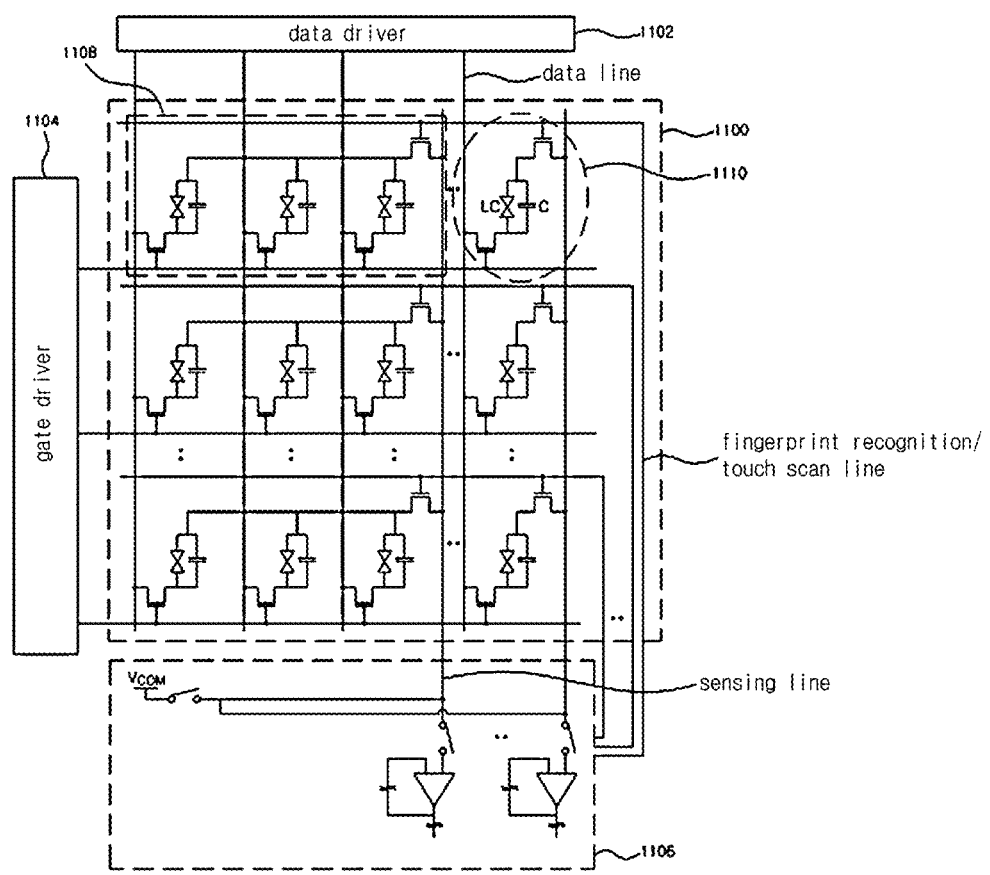
FIG. 11 is a view illustrating circuit of a touch panel according to another embodiment of the invention.
Figure 12:
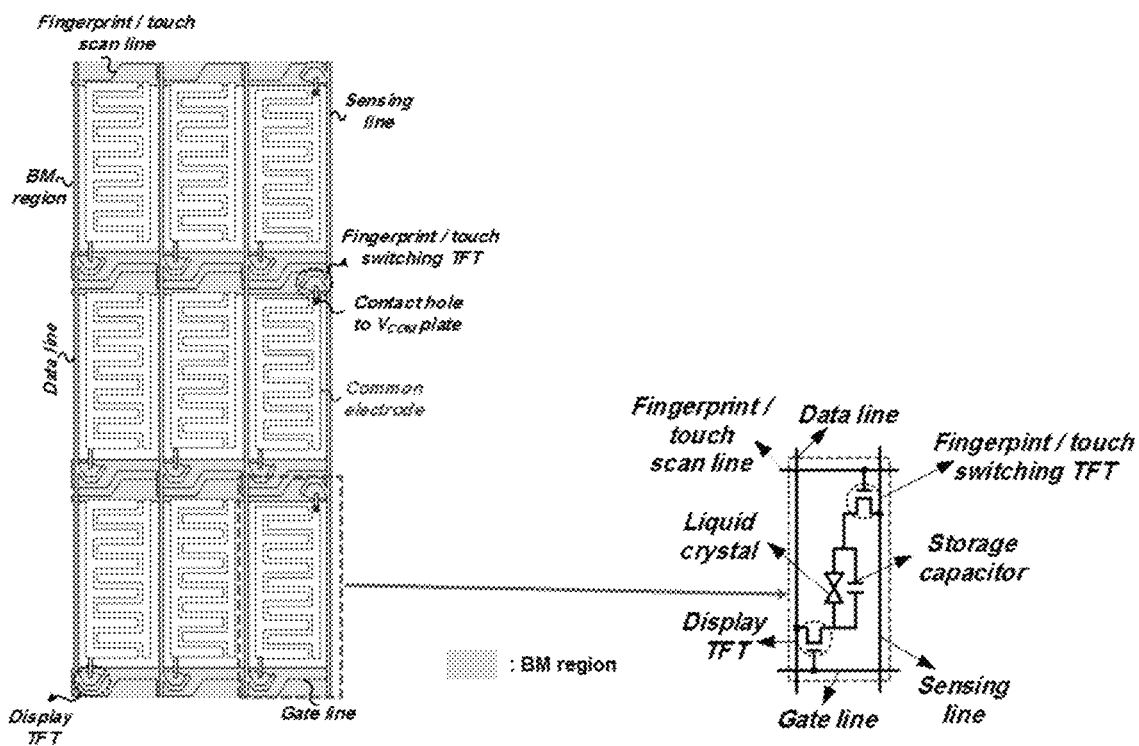
FIG. 12 is a view illustrating layout of the touch panel in FIG. 11 using an IPS mode according to one embodiment of the invention.
Figure 13:
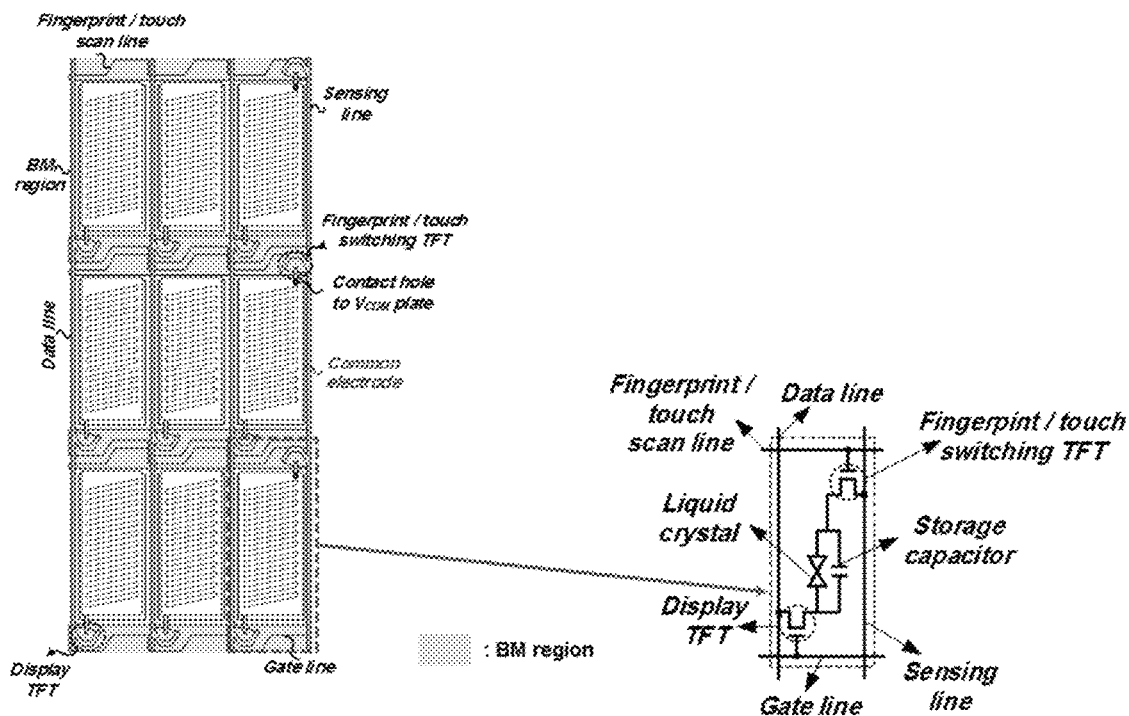
FIG. 13 is a view illustrating layout of the touch panel in FIG. 11 according to an FFS mode.
Figure 14:
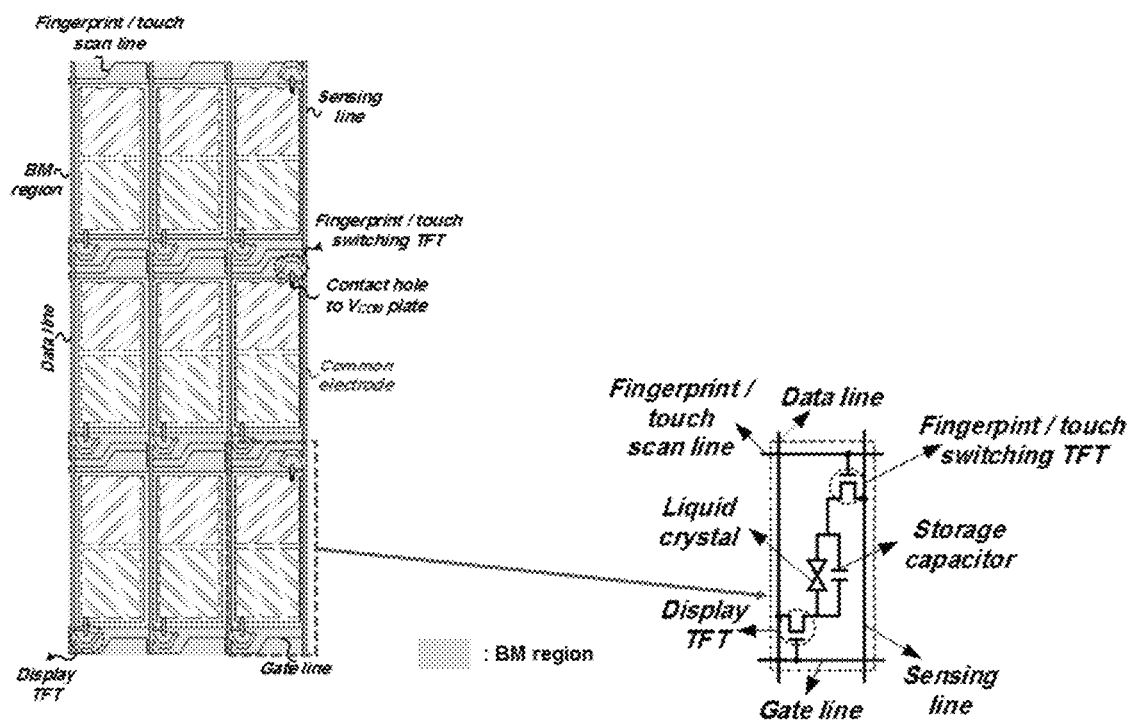
FIG. 14 is a view illustrating layout of the touch panel in FIG. 11 according to one embodiment of the invention.
Figure 15:
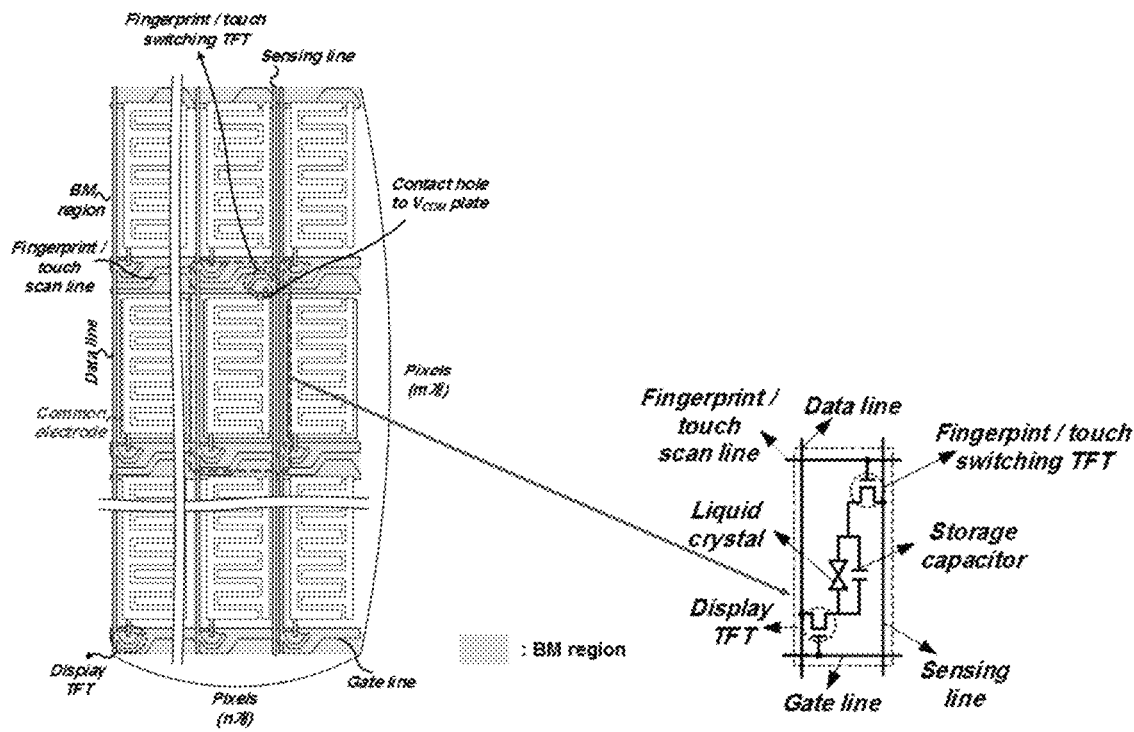
FIG. 15 is a view illustrating layout of the touch panel using the IPS mode according to another embodiment of the invention.
Figure 16:
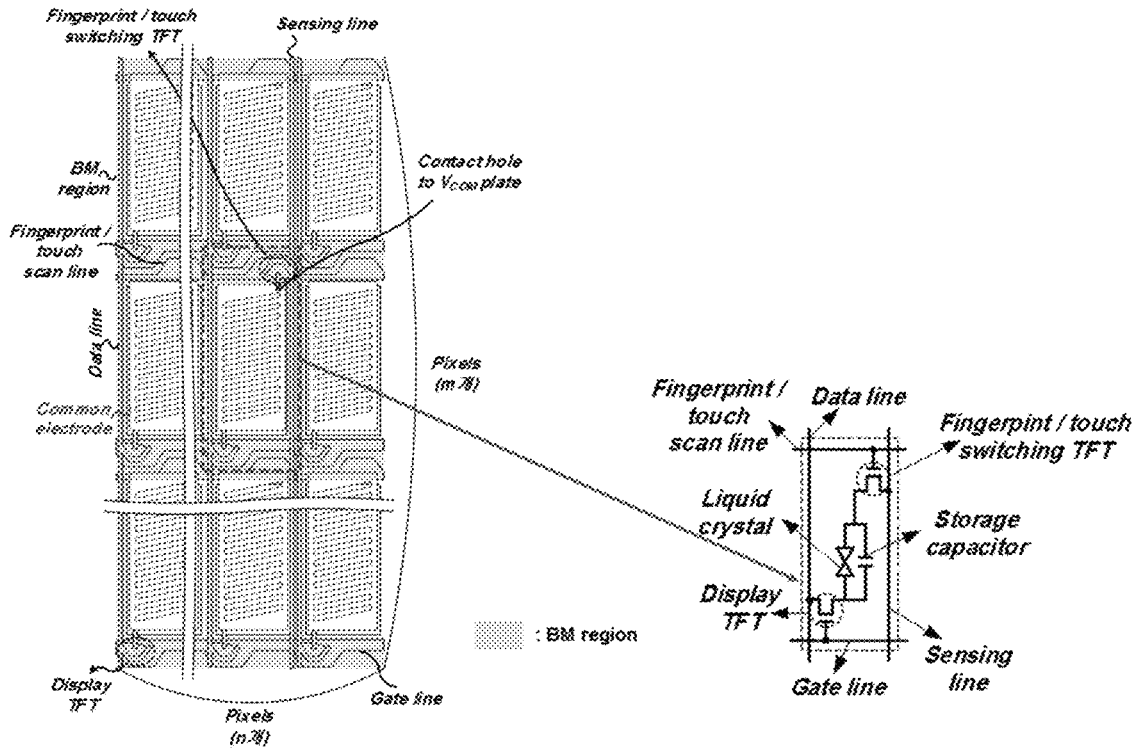
FIG. 16 is a view illustrating layout of the touch panel using the FFS mode according to still another embodiment of the invention.
Figure 17:
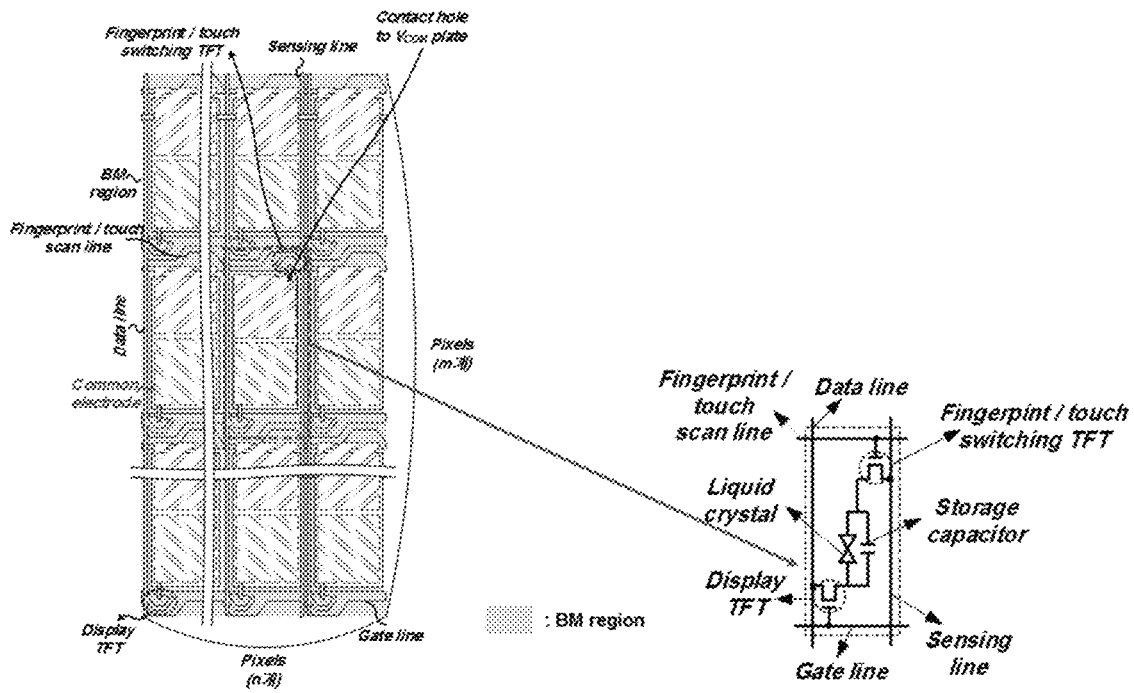
FIG. 17 is a view illustrating layout of the touch panel using the VA mode according to still another embodiment of the invention.

FIG. 11 is a view illustrating circuit of a touch panel according to another embodiment of the invention, FIG. 12 is a view illustrating layout of the touch panel in FIG. 11 using an IPS mode according to one embodiment of the invention, FIG. 13 is a view illustrating layout of the touch panel in FIG. 11 according to an FFS mode, and FIG. 14 is a view illustrating layout of the touch panel in FIG. 11 according to one embodiment of the invention. FIG. 15 is a view illustrating layout of the touch panel using the IPS mode according to another embodiment of the invention, FIG. 16 is a view illustrating layout of the touch panel using the FFS mode according to still another embodiment of the invention, and FIG. 17 is a view illustrating layout of the touch panel using the VA mode according to still another embodiment of the invention.

In FIG. 11, the touch panel of the present embodiment may include touch electrodes 1100, a data driver 1102, a gate driver 1104, a readout circuit 1106 and a touch detection processor (not shown).

Since the other elements except a structure of a pixel 1108 and related sensing line are the same as in FIG. 2, any further description concerning the same elements will be omitted.

The pixel 1108 may include three sub-pixels 1110.

In one embodiment, only one of the sub-pixels 1110 in the pixel 1108 may include the switching TFT. In the pixel 1108 in FIG. 11, only rightmost sub-pixel includes a switching TFT. Of course, a sub-pixel including the switching TFT may be any sub-pixel as long as only one of the sub-pixels 1110 in the pixel 1108 includes the switching TFT.

Only one of the sub-pixels 1110 in the pixel 1108 includes the switching TFT in FIG. 11, but two sub-pixels may include a switching TFT, respectively. That is, a number of the sub-pixel including the switching TFT is variously modified as long as every sub-pixel 1110 in the pixel 1108 does not include the switching TFT.

In one embodiment, the touch/fingerprint recognition electrodes of the pixels 1108 disposed in a row may share one sensing line. Of course, touch/fingerprint recognition electrodes of sub-pixels in the same row of the pixels 1108 may share one sensing line.

This structure may be applied to the touch panel in the IPS mode, the touch panel in the FFS mode and the touch panel in the VA mode. Layouts of the touch panels are shown in FIG. 12 to FIG. 14.

As shown in FIG. 12 to FIG. 14, the scan line, the sensing line and the switching TFT may be disposed in the black matrix BM area.

The touch/fingerprint recognition electrodes may use the vertical field driven method such as the TN mode and the VA mode or the horizontal field driven method such as the IPS mode and the FFS mode.

Briefly, in the touch panel of the present embodiment, the touch/fingerprint recognition electrodes of the pixels 1108 disposed in a row share one sensing line, and thus the touch panel may detect the touch point and obtain the fingerprint information. An operation of the touch panel is similar to that in FIG. 2, which is not described above.

In another embodiment, touch/fingerprint recognition electrodes in a unit of a pixel array not in a unit of a sub-pixel or a pixel may share one sensing line. That is, the touch/fingerprint recognition electrodes of pixel arrays disposed in the same row may share one sensing line. Here, the touch/fingerprint recognition electrode of the pixel array connected to the sensing line is connected to the switching TFT, and the switching TFT is connected to the scan line.

This structure may be applied to the touch panel in the IPS mode, the touch panel in the FFS mode and the touch panel in the VA mode. Layouts of the touch panels are shown in FIG. 15 to FIG. 17.

As shown in FIG. 15 to FIG. 17, the scan line, the sensing line and the switching TFT may be disposed in the black matrix BM area.

The touch/fingerprint recognition electrodes may use the vertical field driven method such as the TN mode and the VA mode or the horizontal field driven method such as the IPS mode and the FFS mode.

Hereinafter, a structure and an operation of a computing device including the above touch panels will be described in detail with reference to accompanying drawings.

Figure 18:
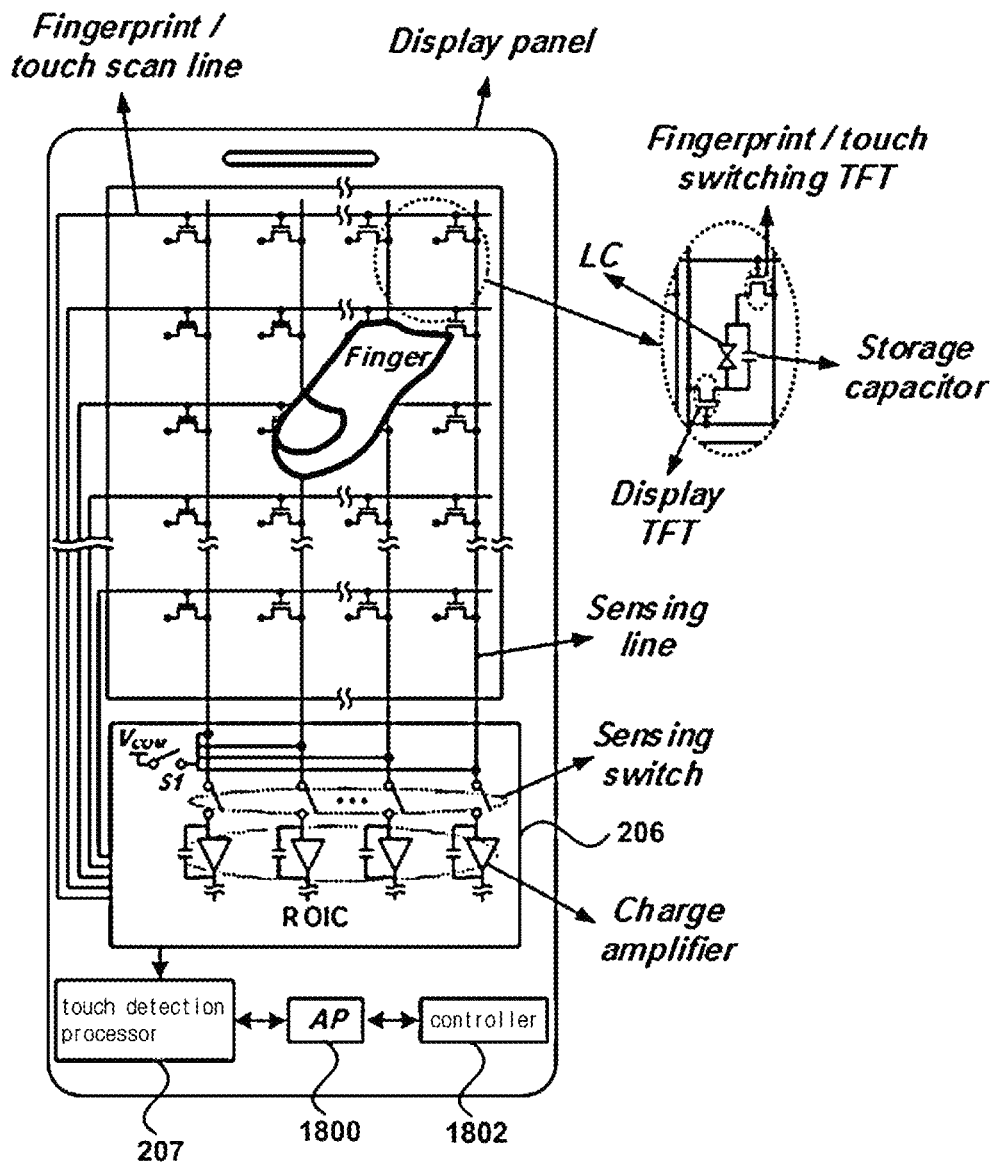
FIG. 18 is a view illustrating a computing device using a touch panel according to one embodiment of the invention.
Figure 19:
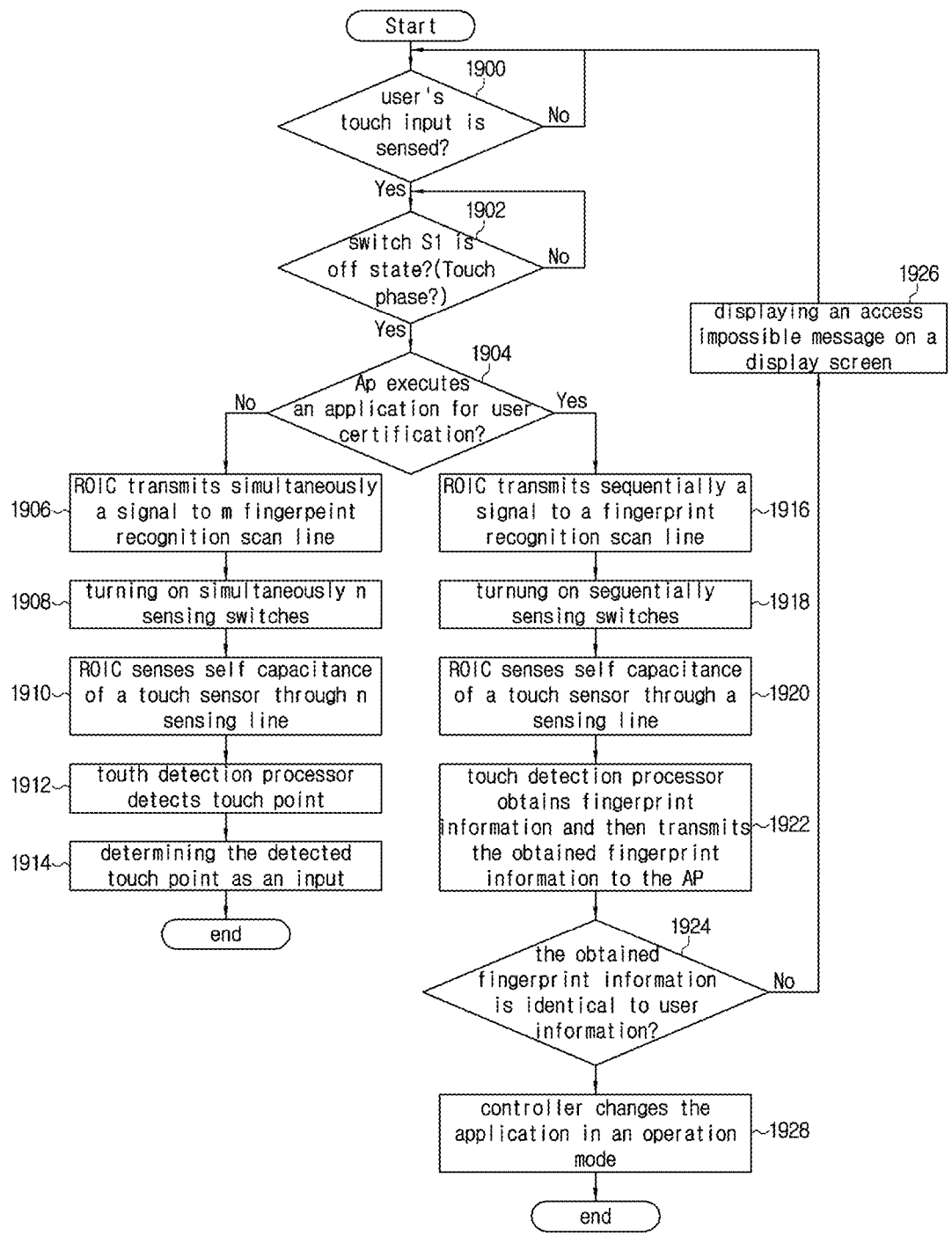
FIG. 19 is a flowchart illustrating an operation of the computing device in FIG. 18 according to one embodiment of the invention.

FIG. 18 is a view illustrating a computing device using a touch panel according to one embodiment of the invention, and FIG. 19 is a flowchart illustrating an operation of the computing device in FIG. 18 according to one embodiment of the invention.

In FIG. 18, the computing device of the present embodiment may further include an application processor AP 1800 and a controller 1802 other than elements in FIG. 2.

The application processor 1800 executes an application (program for internet banking, mobile payment, electronic document exchanging, etc.), and it is necessary to certify a user before driving the application in an operation mode. Accordingly, a fingerprint recognition process should be performed so as to certify the user. The application processor 1800 may verify whether user's fingerprint information is identical to the obtained fingerprint information, for the purpose of user's certification. Of course, the user's fingerprint information is stored in advance.

In one embodiment, a self-certification verifying window may be displayed on a display screen when the fingerprint recognition process is performed.

The controller 1802 may change the application in the operation mode when the user's fingerprint information is identical to the obtained fingerprint information, i.e. the user is certified.

Hereinafter, an operation of the computing device will be described in detail.

In FIG. 19, in a step of S1900, it is discriminated whether or not touch input by the user is sensed.

In a step of S1902, it is discriminated that a switch S1 of the sensing circuit 300 in the readout circuit 206 is off state, when the touch input by the user is sensed.

In a step of S1904, it is discriminated that the application processor AP 1800 executes the application for user certification, when the switch S1 is off state, i.e. in touch phase.

In a step of S1906, the readout circuit 206 transmits simultaneously signals to m scan lines, when the application for the user certification is not executed.

In a step of S1908, the readout circuit 206 turns on n sensing switches.

In a step of S1910, the readout circuit 206 senses for example self capacitance or mutual capacitance of the touch electrode through n sensing lines.

In a step of S1912, the touch point processor 207 detects the touch point through the sensed capacitance.

In a step of S1914, the controller 1802 determines the detected touch point as an input.

In a step of S1916, the readout circuit 206 transmits sequentially signals to the scan lines when the application for user certification is executed.

In a step of S1918, the readout circuit 206 turns on sequentially the sensing switches so as to recognize the fingerprint.

In a step of S1920, the readout circuit 206 senses self capacitance or mutual capacitance of the fingerprint recognition electrodes through the sensing lines.

In a step of S1922, the touch detection processor 207 obtains fingerprint information through the sensed capacitance, and transmits the obtained fingerprint information to the application processor 1800.

In a step of S1924, the application processor 1800 discriminates that the obtained fingerprint information is identical to user information.

In a step of S1926, an access impossible message is displayed on the display screen when the obtained fingerprint information is not identical to the user information.

In a step of S1928, the controller 1802 changes the application in the operation mode when the obtained fingerprint information is identical to the user information.

The touch panel performs both of the touch point detection and the fingerprint recognition in above description. Hereinafter, a structure and an operation of a touch panel for performing only touch point detection without the fingerprint recognition will be described in detail.

Figure 20:
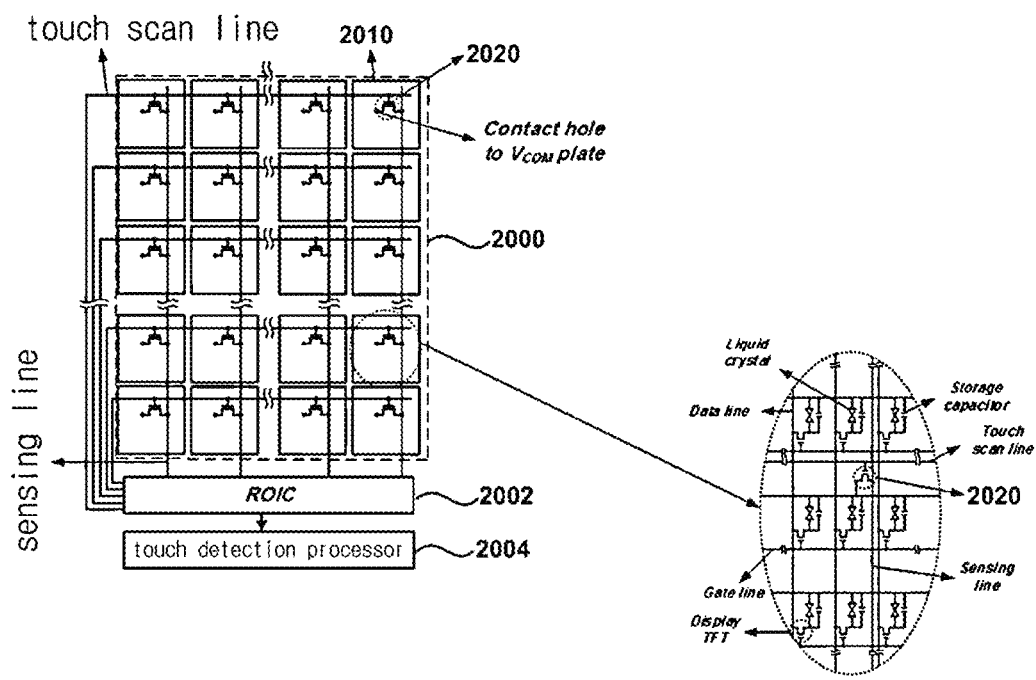
FIG. 20 is a view illustrating a touch panel according to still another embodiment of the invention.
Figure 21:
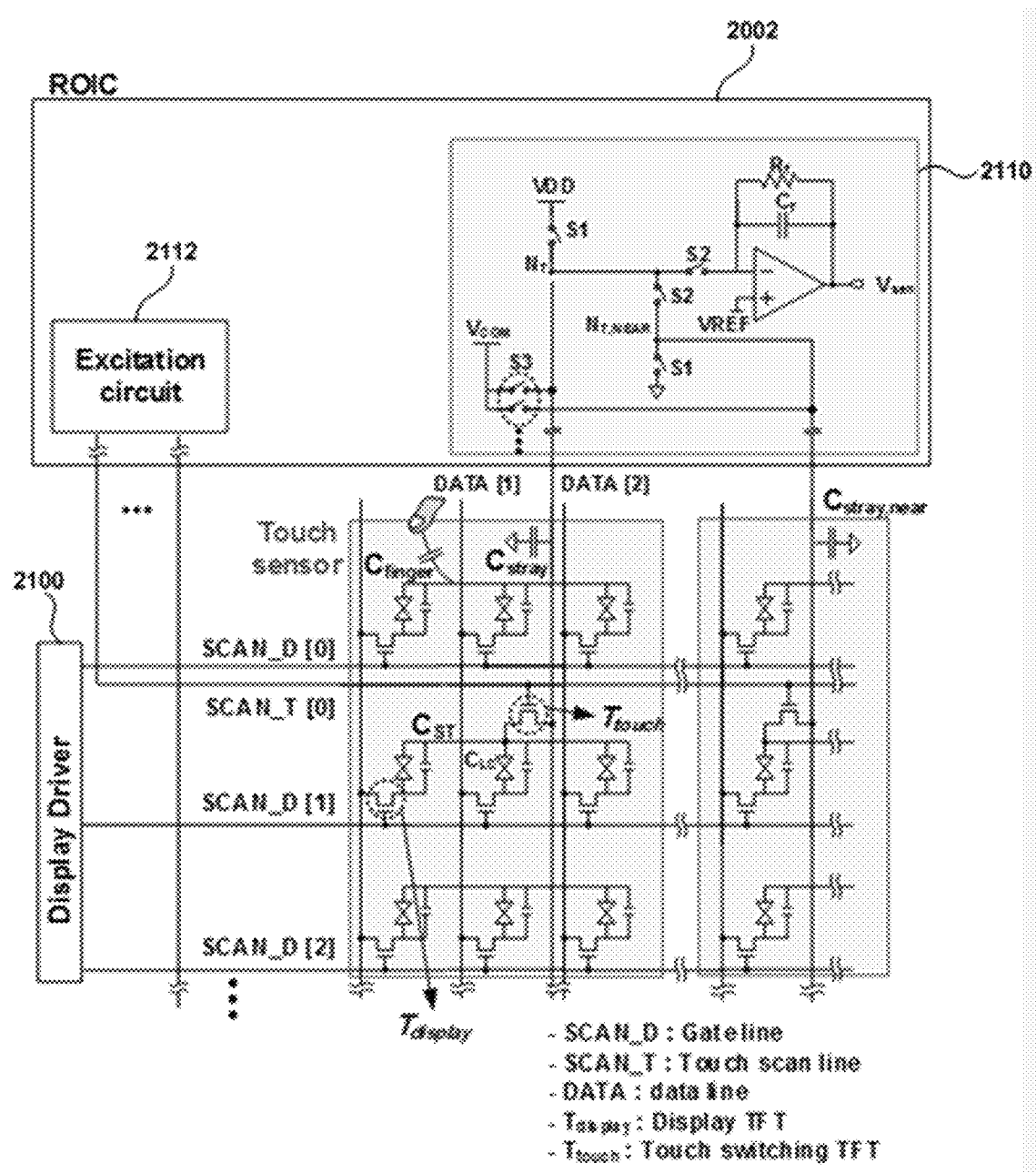
FIG. 21 is a view illustrating circuit for touch detection method in the touch panel in FIG. 20 according to one embodiment of the invention.
Figure 22:
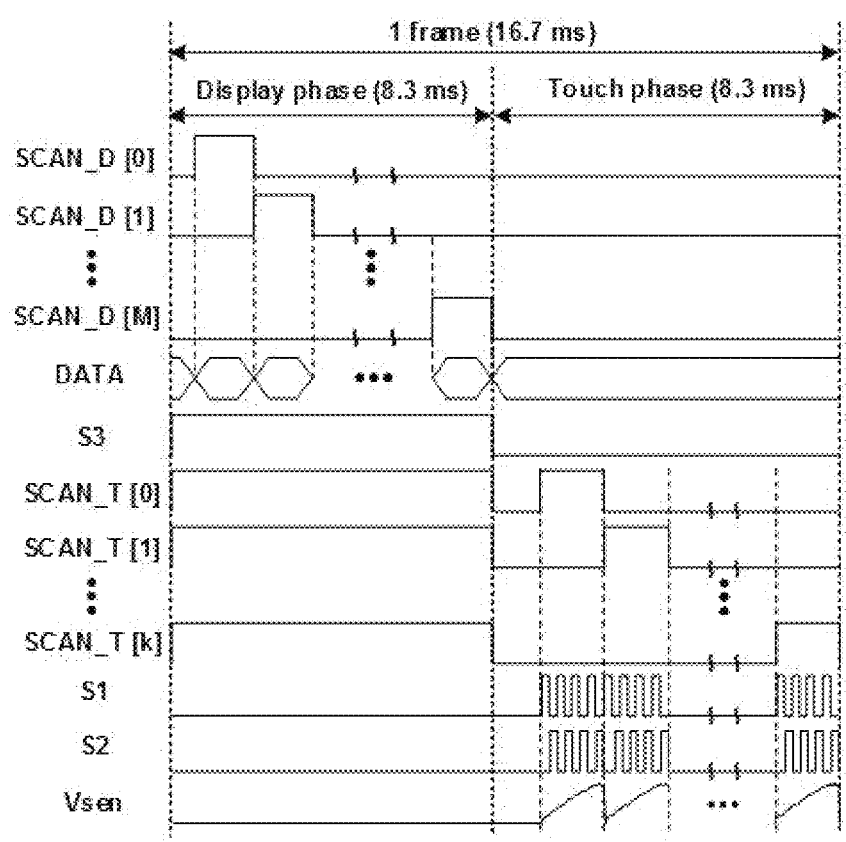
FIG. 22 is a timing diagram illustrating signals used in the touch detection method in FIG. 21.

FIG. 20 is a view illustrating a touch panel according to still another embodiment of the invention, FIG. 21 is a view illustrating circuit for touch detection method in the touch panel in FIG. 20 according to one embodiment of the invention, and FIG. 22 is a timing diagram illustrating signals used in the touch detection method in FIG. 21.

In FIG. 20 and FIG. 21, the touch panel of the present embodiment includes touch sensors 2010, a readout circuit ROIC 2002 and a touch detection processor 2004.

The touch sensor 2010 forms a touch electrode with sub-pixels as shown in a circular dotted line.

In one embodiment, touch electrodes disposed in the same row share one sensing line.

Each of the touch sensors 2010 includes one switching TFT 2020 connected to the sensing line, and corresponding scan line is connected to a gate of the switching TFT 2020.

The readout circuit 2002 includes a sensing circuit 2110 and an excitation circuit 2112. The readout circuit 2002 may not include a sensing switch unlike in FIG. 2.

The excitation circuit 2112 transmits signals to the switching TFTs 2020 through the scan lines.

The sensing circuit 2110 senses self capacitance or mutual capacitance of the touch electrode 2010 through the sensing line.

The touch detection processor 2004 detects touch point through the sensed capacitance.

In FIG. 21 and FIG. 22, the readout circuit 2002 transmits sequentially signals to the scan lines.

Subsequently, the readout circuit 2002 senses sequentially self capacitance or mutual capacitance of a touch electrode corresponding to the scan line to which the signal is transmitted.

Next, the touch detection processor 2004 detects touch point through the sensed capacitance.

In another embodiment, the readout circuit 2002 transmits simultaneously orthogonal signals to the scan lines, and then senses simultaneously self capacitance or mutual capacitance of every touch electrode.

Subsequently, the touch detection circuit 2002 detects touch point through the sensed capacitance.

Shortly, the touch electrodes disposed in a row in the touch panel of the present embodiment share one sensing line.

Hereinafter, an operation of the touch panel in the computing device will be described in detail.

Figure 23:
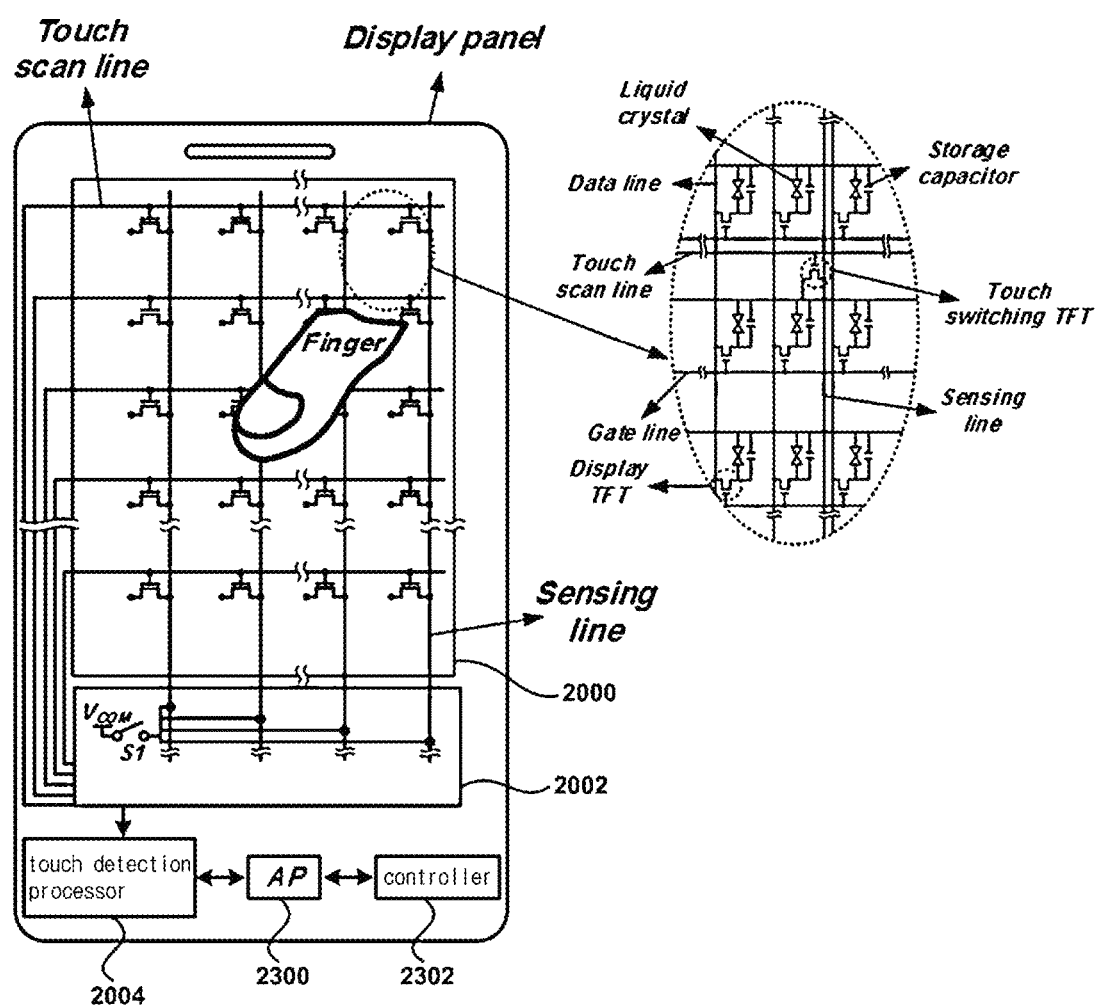
FIG. 23 is a view illustrating a computing device according to another embodiment of the invention.
Figure 24:
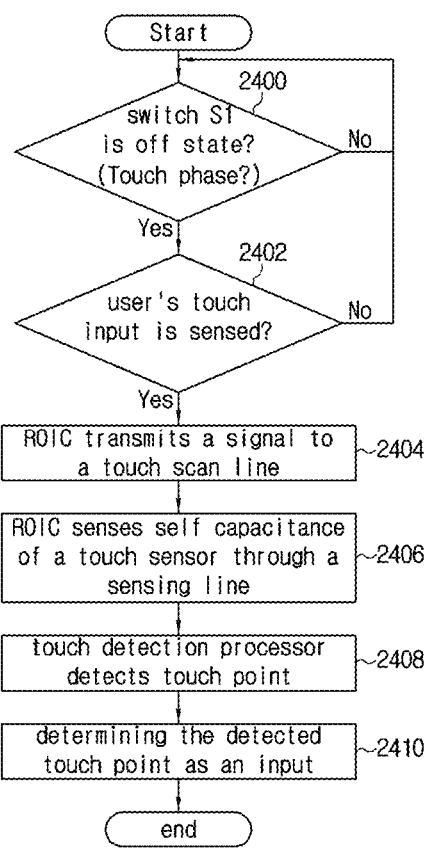
FIG. 24 is a flowchart illustrating a touch recognition process in the touch panel in FIG. 23 according to one embodiment of the invention.

FIG. 23 is a view illustrating a computing device according to another embodiment of the invention, and FIG. 24 is a flowchart illustrating a touch recognition process in the touch panel in FIG. 23 according to one embodiment of the invention.

In FIG. 23 and FIG. 24, in a step of S2400, it is discriminated that a switch S1 of the sensing circuit 2110 in the readout circuit 2002 is off state, i.e. in touch phase.

In a step of S2402, user's touch input is sensed when the switch S1 is off state.

In a step of S2404, the readout circuit 2002 transmits signals to the scan lines when the user's touch input is sensed.

In a step of S2406, the readout circuit 2002 senses self capacitance or mutual capacitance of the touch electrodes through the sensing lines.

In a step of S2408, the touch detection processor 2004 detects touch point through the sensed capacitance.

In a step of S2410, the application processor 2300 or the controller 2302 determines the detected touch point as an input.

Components in the embodiments described above can be easily understood from the perspective of processes. That is, each component can also be understood as an individual process. Likewise, processes in the embodiments described above can be easily understood from the perspective of components.

Also, the technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A self capacitive touch panel comprising:
   (m×n) sub-pixels, m and n being positive integer, respectively;
   a readout circuit configured to sense self capacitance of touch/fingerprint recognition electrodes through sensing lines;
   a touch detection processor configured to detect a touch point or obtain fingerprint information through the sensed self capacitance; and
   a driver configured to drive the sub-pixels,
   wherein touch/fingerprint recognition electrodes included in sub-pixels arranged in a row share one sensing line, and the readout circuit includes a sensing switch connected between the sensing line and a charge amplifier,
   wherein the touch/fingerprint recognition electrodes are connected to the readout circuit through scan lines and the sensing lines are connected to the readout circuit, and
   wherein in touch point detection, the readout circuit transmits simultaneously signals to the scan lines, turns on simultaneously sensing switches between the sensing lines and corresponding charge amplifiers and then senses the self capacitance of the touch/fingerprint recognition electrodes through the sensing lines, and the touch detection processor detects the touch point through the sensed self capacitance.

2. The self capacitive touch panel of claim 1, wherein each of the touch/fingerprint recognition electrodes is a fingerprint recognition sensor capable of recognizing fingerprint, and the touch panel detects the touch point and obtains the fingerprint information through fingerprint recognition.

3. The self capacitive touch panel of claim 1, wherein at least one of the sub-pixels arranged in a row includes a switching transistor which is turned on in a fingerprint recognition process, and wherein one terminal of the switching transistor is connected to a node between a liquid crystal and a storage capacitor in the sub-pixel, other terminal of the switching transistor is connected to the scan line, and the scan line and the sensing line are vertically disposed.

4. The self capacitive touch panel of claim 3, wherein the switching transistor, the scan line and the sensing line are disposed in a black matrix BM area.

5. A self capacitive touch panel comprising:
(m×n) sub-pixels, m and n being positive integer, respectively;
a readout circuit configured to sense self capacitance of touch/fingerprint recognition electrodes through sensing lines;
a touch detection processor configured to detect a touch point or obtain fingerprint information through the sensed self capacitance; and
a driver configured to drive the sub-pixels,
wherein touch/fingerprint recognition electrodes included in sub-pixels arranged in a row share one sensing line, and the readout circuit includes a sensing switch connected between the sensing line and a charge amplifier,
wherein the touch/fingerprint recognition electrodes are connected to the readout circuit through scan lines, and the sensing lines are connected to the readout circuit, and
wherein when the fingerprint information is obtained, the readout circuit transmits simultaneously orthogonal signals to the scan lines, turns on simultaneously sensing switches between the sensing lines and corresponding charge amplifiers and then senses the self capacitance of the touch/fingerprint recognition electrodes through the sensing lines, and the touch detection processor obtains the fingerprint information through the sensed self capacitance.

6. A self capacitive touch panel comprising:
pixels configured to have sub-pixels, respectively; and
a driver configured to drive the pixels,
wherein touch/fingerprint recognition electrodes included in pixels arranged in a row share one sensing line,
wherein only one sub-pixel in each pixel is used for sharing the sensing line, the sub-pixel used for sharing the sensing line includes a switching transistor which is connected to a scan line disposed vertically to the sensing line and is turned on when fingerprint is recognized,
and wherein one terminal of the switching transistor is connected to a node between a liquid crystal and a storage capacitor included in the sub-pixel, and other terminal of the switching transistor is connected to the scan line.

7. The self capacitive touch panel of claim 6, further comprising:
a readout circuit configured to sense self capacitance or mutual capacitance of the touch/fingerprint recognition electrodes through the sensing line; and
a touch detection processor configured to detect a touch point or obtain fingerprint information through the sensed self capacitance or mutual capacitance,
wherein the readout circuit further includes a sensing switch which transmits a signal to the sub-pixel through the scan line and switches connection between the scan line and a charge amplifier.

8. A self capacitive touch panel comprising:
pixel arrays configured to have pixels, respectively; and
a driver configured to drive the pixels,
wherein each of the pixels have at least one sub-pixel, and touch/fingerprint recognition electrodes included in pixel arrays arranged in a row share one sensing line,
wherein only one sub-pixel in each pixel array is used for sharing the sensing line, the sub-pixel used for sharing the sensing line includes a switching transistor which is connected to a scan line vertically disposed to the sensing line and is turned on when fingerprint is recognized,
and wherein one terminal of the switching transistor is connected to a node between a liquid crystal and a storage capacitor included in the sub-pixel, and other terminal of the switching transistor is connected to the scan line.

9. The self capacitive touch panel of claim 8, further comprising:
a readout circuit configured to sense self capacitance or mutual capacitance of the touch/fingerprint recognition electrode through the sensing line; and
a touch detection processor configured to detect a touch point or obtain fingerprint information through the sensed self capacitance or mutual capacitance,
wherein the readout circuit further includes a sensing switch which transmits a signal to the sub-pixel through the scan line and switches connection between the scan line and a charge amplifier.

10. A touch panel comprising:
touch sensors; and
a driver configured to drive the touch sensors,
wherein at least one of the touch sensors have sub-pixels, and touch electrodes included in the sub-pixels arranged in a row share one sensing line,
wherein the touch panel detects a touch point without recognizing a fingerprint,
wherein only one sub-pixel in each touch sensor is used for sharing the sensing line, and the sub-pixel used for sharing the sensing line includes a switching transistor connected to a scan line vertically disposed to the sensing line, and
wherein one terminal of the switching transistor is connected to a node between a liquid crystal and a storage capacitor included in the sub-pixel, and other terminal of the switching transistor is connected to the scan line.

11. The touch panel of claim 10, further comprising:
a readout circuit configured to sense self capacitance or mutual capacitance of the touch electrode through the sensing line; and
a touch detection processor configured to detect a touch point through the sensed self capacitance or mutual capacitance,
wherein the readout circuit transmits a signal to the sub-pixel through the scan line.

12. The touch panel of claim 11, wherein, in touch point detection, the readout circuit transmits sequentially signals to scan lines and then senses self capacitance or mutual capacitance of a touch electrode corresponding to a scan line to which the signal is transmitted, and the touch detection processor detects the touch point through the sensed self capacitance or mutual capacitance.

13. The touch panel of claim 11, wherein when the touch point is detected, the readout circuit transmits simultaneously orthogonal signals to the scan lines and then senses self capacitance or mutual capacitance of the touch electrodes, and the touch detection processor detects the touch point through the sensed self capacitance or mutual capacitance.

* * * * *